United States Patent [19]

Leeper et al.

[11] 4,196,766

[45] Apr. 8, 1980

[54] TIRE CHANGING APPARATUS

[75] Inventors: Charles G. Leeper, Antioch; John F. Wood, Nashville, both of Tenn.

[73] Assignee: Hennessy Industries, Inc., Elk Grove Village, Ill.

[21] Appl. No.: 870,086

[22] Filed: Jan. 17, 1978

[51] Int. Cl.$^2$ ............................................. B60C 25/06
[52] U.S. Cl. ............................. 157/1.26; 144/288 A
[58] Field of Search ................ 144/288 A; 157/1.1, 157/1.17, 1.22, 1.24, 1.26, 1.28

[56] References Cited

U.S. PATENT DOCUMENTS

| | | | |
|---|---|---|---|
| 3,416,588 | 12/1968 | Hilyard | 157/1.17 |
| 3,789,894 | 2/1974 | Adams | 144/288 A |
| 3,930,530 | 1/1976 | Askam | 157/1.24 |
| 4,061,173 | 12/1977 | Daly | 157/1.17 |

FOREIGN PATENT DOCUMENTS 2416668 11/1974 Fed. Rep. of Germany .......... 157/1.17

*Primary Examiner*—James G. Smith
*Attorney, Agent, or Firm*—Wegner, Stellman, McCord, Wiles & Wood

[57] ABSTRACT

A tire changer including a base adapted to be supported upon an underlying surface, a tire supporting table disposed in an elevated position on the base and comprising at least three radially outwardly extending arms, a plurality of hook-shaped notches in the upper surfaces of two of the arms and opening upwardly to define hooks directed towards the center of the table, a plurality of rim clamps, each comprising a pair of spaced plates with aligned hook formations adapted to engage the rim of a wheel placed on the table and interconnected by two spaced rods, the plates being spaced sufficiently so as to straddle a corresponding arm with one of the rods received in a selected one of the notches in the other of the rods in substantial abutment with the upper surface of the corresponding arm to locate the associated hook formation above the corresponding arm in a position opening toward the center of the table at a location generally radially outwardly with respect to the arm of the pin received in the notch, at least two of the clamps being removably received on respective ones of the two arms, a movable mount for another of the clamps so that the same may move in a generally radial path on the third arm and an operator for selectively positioning the additional clamp along that path of movement.

7 Claims, 7 Drawing Figures

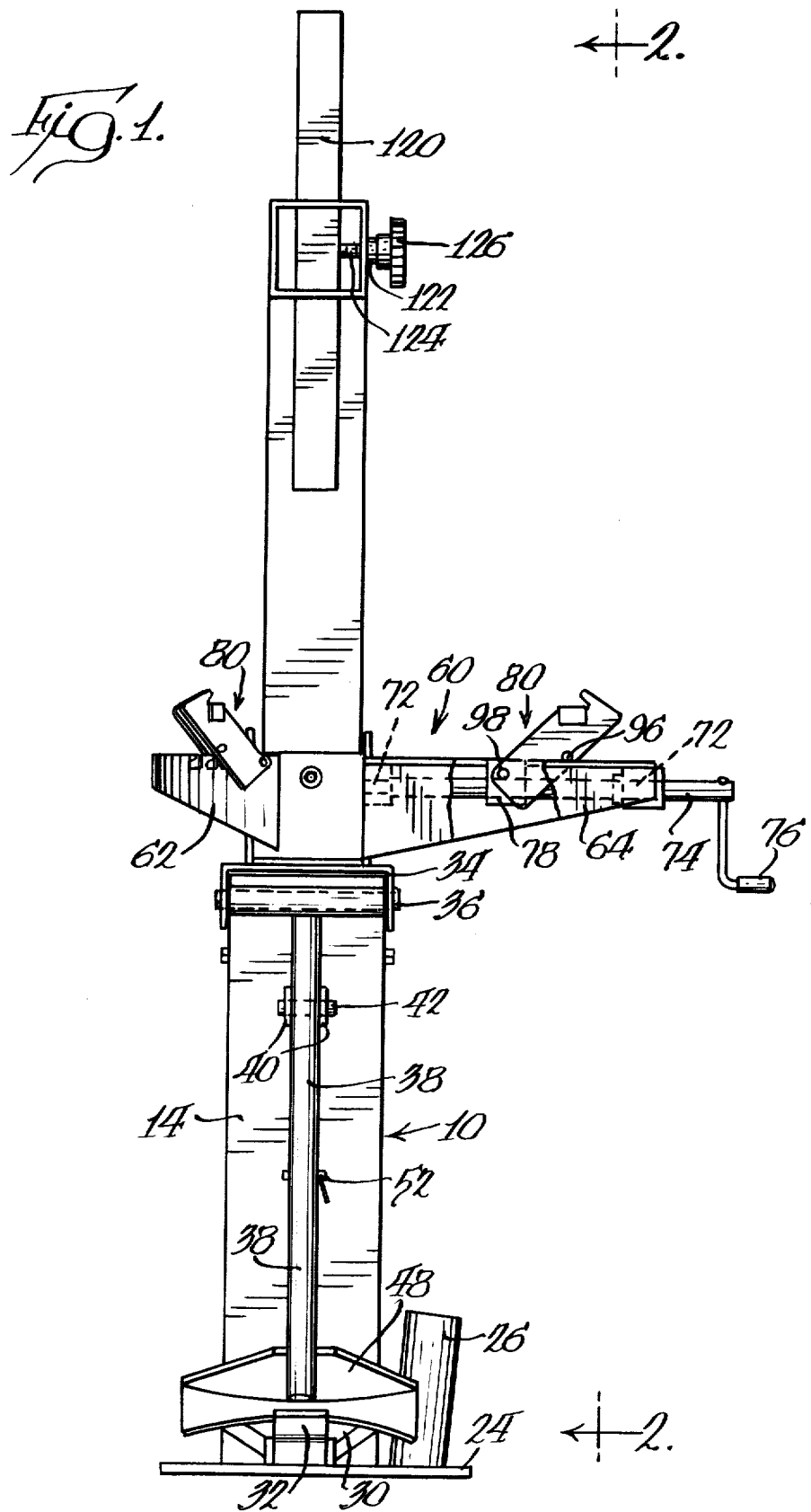

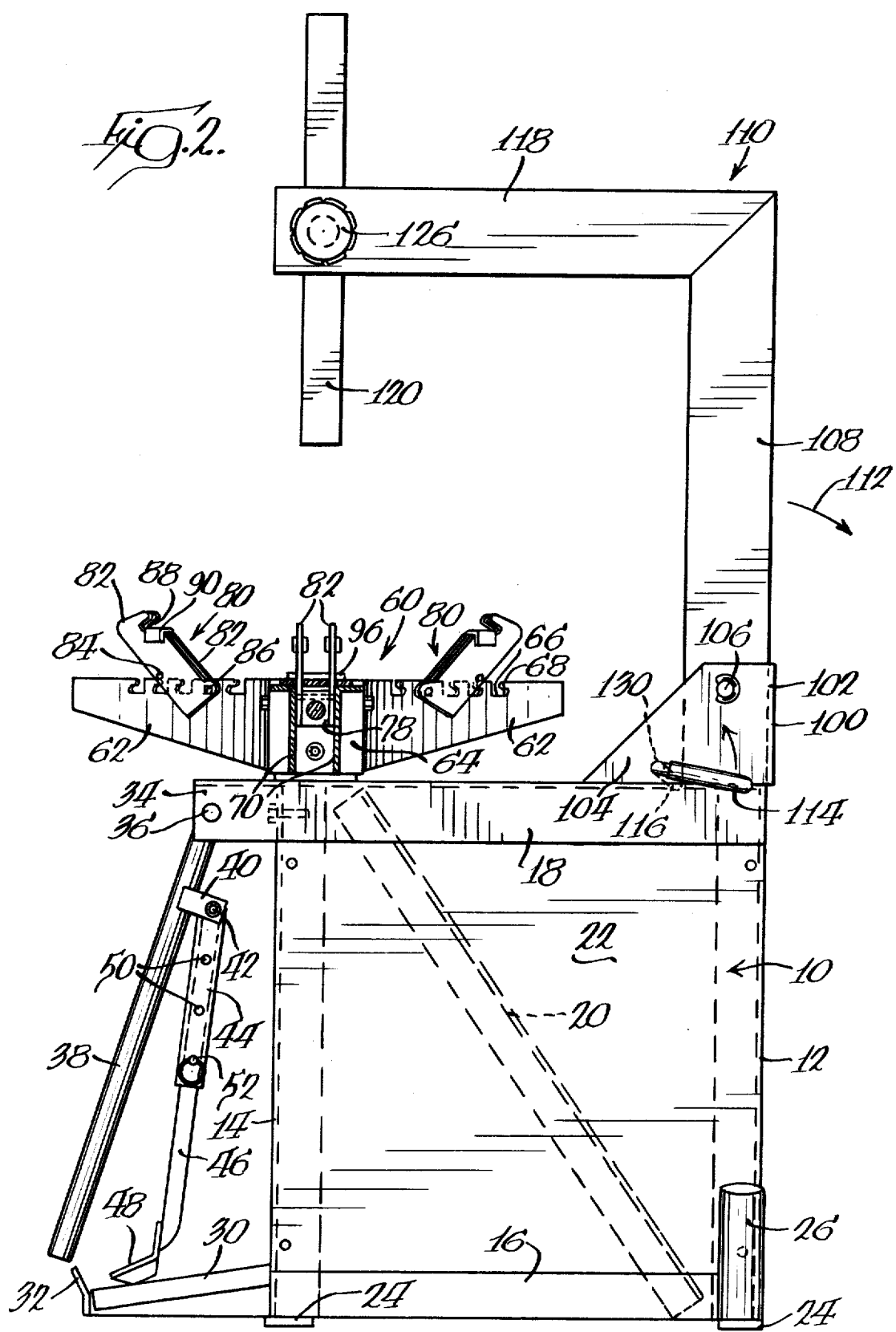

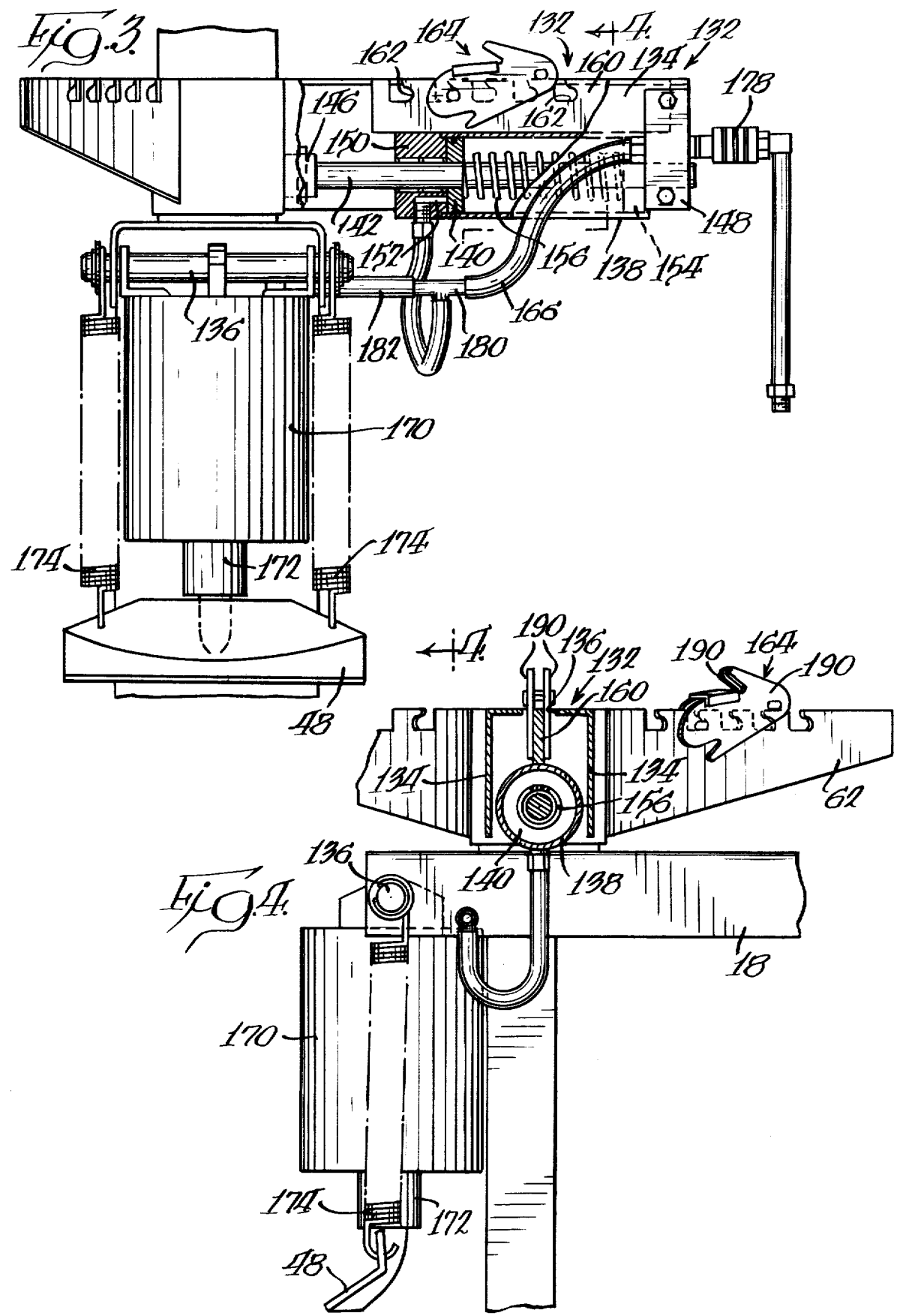

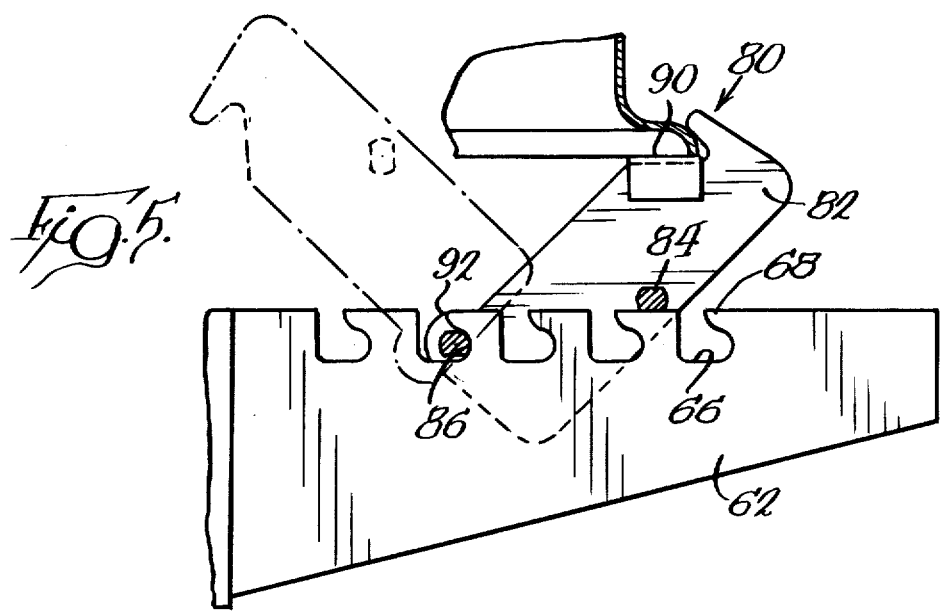
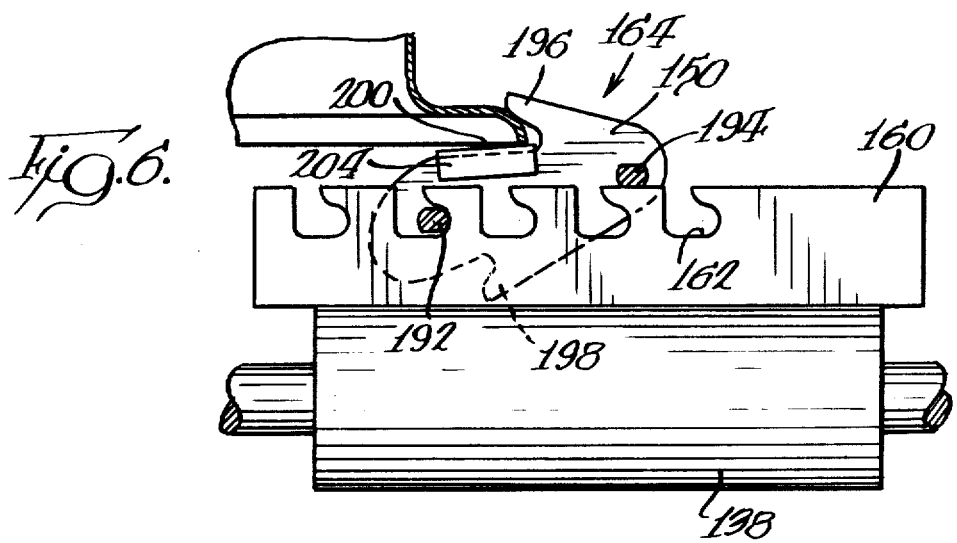
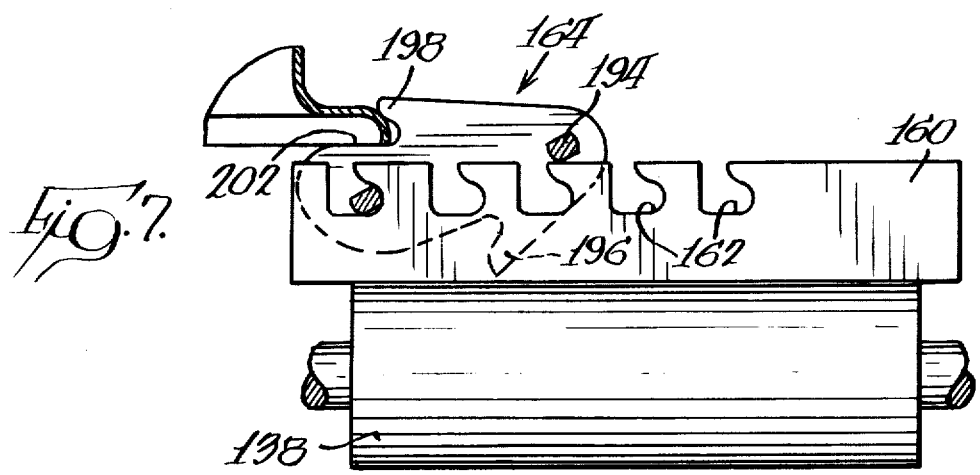

TIRE CHANGING APPARATUS

BACKGROUND OF THE INVENTION

This invention relates to tire changing apparatus for use in tire mounting and demounting operations as well as bead loosening operations.

Over the years, tire changing apparatus have become increasingly complex for the reason that, as labor costs have escalated, it has become more and more desirable from the economic standpoint to more completely mechanize a changing operation. A greater degree of mechanization minimizes the time required to perform a given tire changing operation and thereby minimizes the labor cost involved.

At the same time, there has been an increase in the varieties of vehicles with the consequence that tire changing apparatus must be increasingly flexible in terms of its ability to handle a large variety of differing wheel sizes, wheel types, tire sizes and tire types.

In many instances, however, a service station or vehicle repair shop will not have sufficient demand for tire changing operations in its day-to-day business to justify the capital expense of a highly sophisticated tire changing apparatus. Nonetheless, such a service station or repair shop must be prepared to perform tire changing operations on any of the wide variety of differing wheels, tires, etc., that it may encounter.

Thus, there is a real need for an inexpensive tire changing apparatus having the capability of performing tire changing operations on the large variety of wheels and tire combinations is used today.

SUMMARY OF THE INVENTION

It is the principal object of the invention to provide a new and improved tire changing apparatus. More specifically, it is an object of the invention to provide a tire changing apparatus which is inexpensive in construction and yet has the capability of performing tire changing operations on a wide variety of differing wheel and tire types.

According to the invention, there is provided a tire changer including a base adapted to be supported upon an underlying surface. A tire support table is disposed in an elevated position on the base and comprises at least three radially outwardly extending arms. A plurality of hook-shaped notches are disposed in the upper surfaces of two of the arms and open upwardly to define hooks directed toward the center of the table. A plurality of rim clamps, each comprising a pair of spaced plates with aligned hook formations adapted to engage the rim of a wheel placed upon the table are provided. The plates are interconnected by two spaced rods and are spaced sufficiently so as to straddle a corresponding arm with one of the rods received in a selected one of the notches and the other of the rods in substantial abutment with the upper surface of the corresponding arm to locate the associated hook formation above the corresponding arm in a position opening towards the center of the table and at a location generally radially outwardly with respect to the arm of the pin receivable in the notch. At least two of the clamps are removably received on respective ones of the two arms and means mount another of the clamps for movement in a generally radial path on the third arm. An operator is provided for selectively positioning the last-mentioned clamp along the path of movement to facilitate adjustment.

According to one embodiment, the operator for adjusting for one of the clamps is manually operated, while according to another embodiment, the operator is powered.

The invention contemplates the mounting of a bead loosening tool on the base, in one embodiment, a manually operated bead loosening tool and in another, a powered bead loosening tool.

The invention, in a preferred embodiment, also provides a swingable arm overlying the table which may slidably mount a post to be used as a fulcrum point for a tire servicing tool in the course of mounting and demounting tires.

Other objects and advantages will become apparent from the following specification taken in connection with the accompanying drawings.

DESCRIPTION OF THE DRAWINGS

FIG. 1 is a front elevation of a tire changing apparatus made according to the invention with parts broken away for clarity;

FIG. 2 is a vertical section taken approximately along the line 2—2 in FIG. 1;

FIG. 3 is an enlarged, fragmentary view of a modified embodiment of the invention with parts shown in section;

FIG. 4 is an enlarged, fragmentary, vertical section taken approximately along the line 4—4 in FIG. 3;

FIG. 5 is an enlarged, fragmentary view illustrating the use of one type of rim clamp that may be employed with the apparatus;

FIG. 6 is a view similar to FIG. 5 showing a different form of rim clamp; and

FIG. 7 is a view similar to FIG. 6 illustrating the flexibility of adjustment provided by the rim clamp of FIG. 6.

DESCRIPTION OF THE PREFERRED EMBODIMENT

An exemplary embodiment of a tire changer made according to the invention is illustrated in FIGS. 1 and 2 and is seen to include an elongated, upstanding base, generally designated 10. The base 10 may be formed in any suitable fashion as, for example, by vertically extending channels 12 and 14 defining opposed ends of the base and interconnected by upper and lower channels 16 and 18 to define a generally rectangular configuration. A strut or cross member 20 interconnects the channels 16 and 18 to strengthen the base and sheet metal panels 22 may be used to close the sides of the base.

At its bottom, the base 10 is provided with transversely extending plates 24 which act as feet to be received on an underlying surface to provide stability. The foot 24 adjacent the end defined by the channel 12 is provided with a vertically, slightly angled, upstanding, open tube 26 which may receive a conventional tire mounting and demounting tool to serve as a holder therefor. Near the bottom of the base 10 at the end defined by the channel 14, a slightly angled tire support surface 30 formed of plates or the like extends therefrom. At the end of the support surface 30, there is provided an upwardly extending finger 32. The finger 32 is used to locate a wheel on the support surface 30 for bead loosening purposes.

Specifically, a wheel, in a generally horizontal position, may have one side thereof disposed on the surface 30 and the opposite side thereof resting on the surface supporting the base 10. A force may then be exerted on the wheel to pull the same firmly against the finger 32. The wheel will then be properly positioned for bead loosening, as will appear.

The channel 18 includes an extension 34 past the end of the base defined by the channel 14 which receives a pivot pin 36. The pivot pin journals an elongated shaft-like handle 38 for rotation about a generally horizontal axis. Intermediate the ends of the handle 38, a pair of ears extend toward the base 10 and, by means of a pivot pin 42, mount one end of an elongated tube 44. A rod 46 is telescopingly received within the tube 44 and, at its lower end, mounts a conventional bead loosening shoe 48.

The tube 44 is provided with a plurality of apertures 50 as is the rod 46, the apertures in the latter not being shown. A positioning pin 51 may be inserted through aligned ones of the apertures 50 whereby the overall length of the tube 44 and the rod 46 can be selectively adjusted as desired.

Once a wheel is positioned, as mentioned preceding, the shoe 48 may be positioned on the upper sidewall of the tire on the wheel and, as viewed in FIG. 2, a counterclockwise force exerted on the handle 38. This will result in the loosening of the bead of the tire on the wheel so positioned, assuming, of course, that the same has been deflated.

A tire supporting table, generally designated 60, is mounted on the top of the base 10 adjacent the end defined by the channel 14 and is comprised of three, generally equally angularly spaced, radially outwardly extending arms. Two of the arms are designated 62, wile the third is designated 64.

As best seen in FIG. 2, the arms 62 have their upper surfaces provided with a series of hook-like notches 66 which open upwardly and which include projections 68 extending toward the center of the table. The arms 62 are formed of individual plates.

The arm 64 is formed of a pair of spaced plates 70, as best seen in FIG. 2, and, as seen in FIG. 1, spaced bearings 72 at opposite ends of the arm 64 journal a threaded shaft 74 for rotation about an axis generally parallel to the upper surface of the arm 64. Radially outwardly of the arm 64, the threaded shaft 74 is provided with a crank 76 so that a rotative force can be applied to the shaft 74.

Between the plates 70 defining the arm 64, and impaled on the threaded shaft 74, is a traveling nut structure 78. The nut structure 78 is configured such that it cannot rotate with the shaft 74 when the shaft 74 is rotated, such rotating being halted by abutment with the adjacent plates 70. Consequently, rotation of the shaft 74 will advance the nut 78 along the length of the arm 64, the direction of movement depending upon the direction of rotation of the shaft 74.

Each of the arms 62 and 64 is provided with a rim clamp, generally designated 80. Each rim clamp 80 is defined by a pair of spaced plates, the spacing being such that they may straddle the arms 62. The plates 82 are interconnected by two, spaced rods 84 and 86. One corner of each of the plates 82 is provided with a hook formation 88 for engaging a wheel rim 90 (FIG. 5) and it will be seen that each hook formation 80 includes a generally horizontal surface 90 when the clamp 80 is properly positioned on its associated arm 62. This serves to elevate the wheel above the arm 62 such that components thereof that may be wider than the rim, will not interfere with proper positioning of the wheel in the clamps due to interference with the center of the table 60.

The pin 86 is adapted to be received in any one of the notches 66, as illustrated in FIGS. 2 and 5, while the pin 84 is adapted to engage the upper surface of the corresponding arm 62 to position the clamps, as illustrated in FIG. 2, and as shown in solid lines in FIG. 5.

Preferably, the cross section of at least the pin 86 is somewhat elliptical, as best seen in FIG. 5, and positioned on the plates 62 such that its major axis will be horizontal when the clamp 82 is in the solid line position. It is also preferred that the length of the major axis of such pin 86 be greater than the width of the entrance 92 to each of the slots 66. Consequently, the clamps 80 cannot be easily dislodged. Rather, it will be necessary to rotate each clamp to the dotted line position shown in FIG. 5 so that the major axis of each pin 86 is generally vertically aligned. The width of each pin 86 along its minor axis is slightly less than the width of the entrance 92 to each slot 66 so that when so rotated, the clamp may then be removed for repositioning.

The clamp 80 associated with the arm 64 may be generally similarly constructed although, preferably, intermediate the ends of the two plates forming the clamp, a pin 96 will be provided and, as seen in FIG. 2, the same extends beyond both plates to ride on the upper surfaces of the arm 64. A pin 98 connects the clamp 80 associated with the arm 64 to the traveling nut 78 for movement therewith.

In placing a wheel on the table, the clamps 80 associated with the arm 62 are approximately positioned and the wheel disposed thereon such that the rim enters both of the hook formations 88. The shaft 74 is then rotated via the crank 76 to bring the clamp 80 on the arm 64 into firm engagement with the rim of the wheel to clamp the same in place in a position centered, or approximately centered, on the table 60.

The top of the base 10 adjacent the end defined by the channel 12 is provided with a pair of upstanding walls defined by a channel 100. The base 102 of the channel 100 is generally parallel to the channel 12 and the two walls 104 (only one of which is shown) extend toward the table 60. Near the upper end of the channel 100, a horizontal pivot pin 106 is located and the same journals a leg 108 of an inverted, L-shaped arm, generally designated 110, for rotation about a horizontal axis. The pin 106 is preferably so located that when the arm 110 is rotated in the direction of an arrow 112, approximately 30° or more of movement is permitted before interference with the base of the channel 102 will result.

Near their lower extremity, the walls 104 pivotally mount, for rotation about a horizontal axis, a rotary wedge member having a handle 114. Between the walls 104 and confronting the lower extremity of the leg 108, is an eccentric wedge 116 which may be brought into wedging engagement with the leg 108 at a location below the pivot 106 to prevent pivotal movement and hold the arm 110 in the position illustrated in FIG. 2.

The upper leg 118 of the arm 110 extends generally horizontally to a location overlying the center of the table 60. As seen in FIG. 1, the same slidably receives a cylindrical post 120 such that the post 120 may move in a generally vertical path aligned with the center of the table 60. A nut 122 is welded to the leg 118 and a threaded shaft 124 having a handle 126 is received in the nut and is of sufficient length so as to be brought into clamping engagement with the post 120 to firmly hold the same in any desired vertical position. Consequently, when a wheel is clamped to the table, and the arm 110 is in the position illustrated in FIG. 2, the post 120 can be lowered to provide a fulcrum for a tire changing tool (not shown) during a tire mounting or demounting operation.

In some cases, the post 120 may be supported by the table 60 in a hollow central recess (not shown) therein, in which case the arm 110 becomes unnecessary and may, in fact, interfere with the changing operation. In such a case, it is only necessary to rotate the wedge member 116 out of engagement with the leg 108 and pivot the arm 110 in the direction of the arrow 112 to a position that is out of the way. Movement in the direction of the arrow 112 may be limited either by engagement of the lower end of the leg 108 with a noneccentric part 130 of the wedge member 116 or by engagement with the base 102 of the channel 100 or by both.

FIGS. 3 and 4 illustrate a modified embodiment of the invention wherein both the bead loosener and the traveling clamp are powered. In all other respects, save those noted hereinafter, the embodiment illustrated in FIGS. 3 and 4 is substantially identical to that previously described.

As seen in FIGS. 3 and 4, the arm 64 is replaced by an arm 132 which is defined by a pair of spaced, inverted, L-shaped plates 134 to define an opening 136 extending the length of the arm 132. A cylinder 138 is located between the plates 134 and a piston 140 is disposed within the cylinder 138. A rod 142 is connected by a bracket 146 to the center of the table and by a bracket 148 to the remote end of the arm 132 and the piston 40 is affixed to the rod 142.

The radially inner end of the cylinder 138 is provided with a head 150 having a fluid inlet port 152. The opposite end of the cylinder 138 is provided with a head 154 through which the rod 142 extends and a spring 156 is disposed within the cylinder and sandwiched between the piston 140 and the head 154 concentrically about the rod 142.

Finally, a plate 160 is secured to the upper side of the cylinder 138 in alignment with the opening 136 and is provided with a series of hook-like notches 162 configured as mentioned previously. A clamp, such as the clamp 80, previously described, or such as a clamp 164 shown in FIGS. 3 and 4, is received by the plate 160.

When pressure is applied to the interior of the cylinder 138 through the inlet 152 via a line 166, the cylinder 138 will bodily move to the left, as viewed in FIG. 3, carrying the rim clamp 164 with it, to apply a positive clamping pressure to a wheel rim. When fluid pressure is released, the spring 156 will restore the components to the position illustrated to relieve clamping pressure.

To provide a powered bead loosener, the embodiment shown in FIGS. 3 and 4 contemplates the use of a single-acting fluid cylinder 170 suitably journalled to the extension 34 of the base 10 by the pivot pin 136. The cylinder 170 has an extendable rod 172 which, in turn, mounts bead loosening shoe 48. the line 166 is connected to the upper end of the cylinder 170 so that when fluid pressure is applied, the shoe 48 will be driven downwardly to engage the sidewall of an underlying tire to loosen the bead thereof.

For return purposes, the pivot pin 36 is lengthened to extend somewhat beyond both sides of the channel 18 defining the extension 34 to mount coil springs 174 which, in turn, are also connected to the shoe 48.

To simplify the fluid system, the arm 164, at its radially outer extremity, mounts a three-way slide valve 178 which, in turn, is connected to the conduit 166. A tee 180 is connected to the line 166 and to the inlet 152 of the cylinder 138 as well as a conduit 182 which extends to the cylinder 170. Both cylinders will accordingly be pressurized simply by the slide valve 178. Pressure is relieved by shifting the slide valve 178 to vent the cylinders.

For increased flexibility in handling a wide variety of wheel sizes, the clmps 164 may be utilized in lieu of the clamps 80. As seen in FIG. 4, each of the clamps 164 is comprised of two, spaced plates 190. The plates 190 are spaced sufficiently so as to straddle the arms 62 or the plate 160, as the case may be.

In the case of the clamps 164, as best seen in FIGS. 6 and 7, eccentric-shaped rods 192 and 194 interconnect the plates 190 adjacent the ends thereof. The cross section of the rods 192 and 194 is eccentric for the purposes mentioned previously so as to cooperate with the notches 162 in the plate 160 or, for that matter, the notches 66 in the arms 62, to prevent inadvertent dislodgement, as mentioned previously.

Both sides of each plate 190 are provided with hook formations 196 and 198.

As can be seen in FIGS. 6 and 7, the hook formation 198 is closer to the locating pin 192 than the hook formation 196. Consequently, for disposition of the locating pin 192 in any given one of the notches 162, two differing wheel sizes may be easily accommodated simply by switching the clamp 164 from the position illustrated in FIG. 6 wherein the hook formation 196 is uppermost to the position illustrated in FIG. 7 wherein the hook formation 198 is uppermost.

It will also be noted that each of the hook formations 196 and 198 is provided with a generally horizontally extending surface 200 or 202, as the case may be, to somewhat elevate the rim of the table for the purposes mentioned previously.

Lastly, in order to accommodate tire changing on so-called decorative rims without marring the same, the flat surfaces 200, 202 or the flat surfaces 90 used on the clamps 80 can be provided with a channel-shaped piece of plastic 204. The rim will then rest on the plastic 204 to prevent metal-to-metal contact and clamping force will be applied by the hook formations inwardly of the edge where any scratching or the like will not be visible.

From the foregoing, it will be appreciated that a tire changing apparatus made according to the invention may be inexpensively fabricated and yet is able to be utilized in changing tires on a wide variety of wheel sizes and for varying tire types.

The embodiments of the invention in which an exclusive property or privilege is claimed are defined as follows:

1. A tire servicing stand comprising:

a base adapted to be supported upon an underlying surface;

a tire supporting table disposed in an elevated position on said base and comprising at least three radially outwardly extending arms;

a plurality of hook-shaped notches in the upper surfaces of two of said arms and opening upwardly to define hooks directed toward the center of said table;

a plurality of rim clamps, each comprising a pair of spaced plates with aligned hook formations adapted to engage the rim of a wheel placed upon said table and interconnected by two spaced pins, said plates being spaced sufficiently so as to straddle a corresponding arm with one of said pins received in a selected one of said notches and the other of said pins in substantial abutment with the upper surface of the corresponding arm to locate the associated hook formation above the corresponding arm in a position opening toward the center of said table at a location generally radially outwardly with respect to said arm of said pin receivable in said notch;

at least two of said clamps being removably received on respective ones of said two arms;

means mounting another of said clamps for movement in a generally radial path on the third arm;

an operator for selectively positioning said another clamp along said path of movement;

an inverted, L-shaped arm;

means pivoting said arm to said base in spaced relation to said table so that said arm may be pivoted between a position remote from said table and a position overlying said table;

a post slidably mounted on said L-shaped arm at an end thereof remote from said pivot for movement toward and away from said table and nominally aligned with the center of said table;

clamping means for clamping said post to said arm; and a manually operable wedge pivotally mounted adjacent to but spaced from said pivot means for engaging said arm to hold said arm in said last named position.

2. A tire servicing stand comprising:

a base adapted to be supported upon an underlying suface;

a tire supporting table disposed in an elevated position on said base and comprising at least three radially outwardly extending arms;

a plurality of hook-shaped notches in the upper surfaces of two of said arms and opening upwardly to define hooks directed toward the center of said table;

a plurality of rim clamps, each comprising a pair of spaced plates with aligned hook formations adapted to engage the rim of a wheel placed upon said table and interconnected by two spaced pins, said plates being spaced sufficiently so as to straddle a corresponding arm with one of said pins received in a selected one of said notches and the other of said pins in substantial abutment with the upper surface of the corresponding arm to locate the associated hook formation above the corresponding arm in a position opening toward the center of said table at a location generally radially outwardly with respect to said arm of said pin receivable in said notch;

at least two of said clamps being removably received on respective ones of said two arms;

means mounting another of said clamps for movement in a generally radial path on the third arm; and an operator for selectively positioning said another clamp along said path of movement, said operator comprising a fluid cylinder having a piston contained therein, a rod secured to said piston and extending from said cylinder, and a spring within said cylinder biasing said rod out of said cylinder, said rod being secured to said base and said another clamp being mountable on said cylinder, the application of fluid under pressure to said cylinder oppositely of said spring causing said cylinder to move in said radial path in one direction, said spring causing said cylinder to move in said radial path in the opposite direction.

3. A tire servicing stand comprising:

a base adapted to be supported upon an underlying surface;

a tire supporting table disposed in an elevated position on said base and comprising at least three radially outwardly extending arms;

a plurality of hook-shaped notches in the upper surfaces of two of said arms and opening upwardly to define hooks directed toward the center of said table;

a plurality of rim clamps, each comprising a pair of spaced plates with aligned hook formations adapted to engage the rim of a wheel placed upon said table and interconnected by two spaced pins, said plates being spaced sufficiently so as to straddle a corresponding arm with one of said pins received in a selected one of said notches and the other of said pins in substantial abutment with the upper surface of the corresponding arm to locate the associated hook formation above the corresponding arm in a position opening toward the center of said table at a location generally radially outwardly with respect to said arm of said pin receivable in said notch, said pins extending between said plates near opposite ends thereof and wherein said hook formations are located on both sides of said plates, one of said hook formations being located closer to one of said pins than the other hook formation on the opposite side of said plates, whereby said clamp may be inverted to permit selective use of said hook formations to accommodate a large variety of differing rim sizes;

at least two of said clamps being removably received on respective ones of said two arms;

means mounting another of said clamps for movement in a generally radial path on the third arm; and an operator for selectively positioning said another clamp along said path of movement.

4. A tire servicing stand comprising:

a base adapted to be supported upon an underlying surface;

a tire supporting table disposed in an elevated position on said base and comprising at least three radially outwardly extending arms;

a plurality of clamp mounting means on two of said arms;

a plurality of rim clamps;

at least two of said clamps being removably received on the clamp mounting means of said two arms;

means mounting another of said clamps for movement in a generally radial path on the third arm; and an operator for selectively positioning said another clamp along said path of movement comprising a fluid cylinder having a piston contained therein, a rod secured to said piston and extending from said cylinder, and a spring within said cylinder biasing said rod out of said cylinder, said rod being secured to said base and said another clamp being mountable on said cylinder, the application of fluid under pressure to said cylinder oppositely of said spring causing said cylinder to move in said radial path in one direction, said spring causing said cylinder to move in said radial path in the opposite direction.

5. A tire servicing stand comprising:
a base adapted to be supported upon an underlying surface;
a tire supporting table disposed in an elevated position on said base and comprising at least three radially outwardly extending arms;
a plurality of hook-shaped notches in the upper surfaces of two of said arms and having relatively narrow upwardly opening entrances to define hooks directed toward the center of said table;
a plurality of rim clamps, each comprising a pair of plates spaced about an associated one of said arms and provided with a hook formation adapted to engage the rim of a wheel placed upon said table and a transversely extending rod interconnecting said plates and somewhat elliptical in cross section to be received in a selected one of said notches to locate the associated hook formation above the corresponding arm in a position opening toward the center of said table at a location generally radially outwardly with respect to said arm of said rod receivable in said notch, said rods having major axes greater than said entrances and minor axes narrower than said entrances whereby said clamps may be removed or dislodged from said notches only when said major axes are aligned with said entrances;
at least two of said clamps being removably received on respective ones of said two arms;
an additional clamp means mounting said additional clamp for movement in a generally radial path on the third arm; and
an operator for selectively positioning said additional clamp along said path of movement.

6. A tire changing apparatus comprising:
an upstanding, elongated base having opposed ends;
a wheel supporting surface extending from one of said ends near the bottom thereof;
a wheel positioning finger extending upwardly from said surface and spaced from said one end;
an extension on said base near the top thereof and extending from said one end;
a bead loosening tool mounted on said extension and movable toward and away from said surface to loosen the bead of a tire on a wheel supported by said surface and positioned by said finger;
a table defined by at least three angularly spaced, radially extending arms mounted on said base at the top thereof adjacent saidone end, one of said arms journalling a threaded shaft for rotation on an axis extending parallel to said one arm, the others of said arms being provided with radially spaced hook-like notches;
a traveling nut structure mounted on said shaft;
a crank connected to said shaft for rotating the same;
a plurality of rim clamps, one for each arm, one connected to said traveling nut structure for movement therewith, the others being associated with corresponding ones of said other arms and including pins for selective receipt in said hook-like notches so that the radial position of said rim clamps may be adjusted to accommodate wheels of varying sizes;
spaced upstanding walls secured to said base at its top adjacent said other end and opening toward said table;
an inverted, L-shaped arm having a generally vertically disposed first leg between said walls and a generally horizontally extending second leg over said table;
a horizontal pivot pin journalling said first leg between said walls near, but not at, the end of said first leg;
a wedge member pivoted by said walls immediately adjacent said end of said first leg and between said table and said first leg, said wedge member including an eccentric portion engageable with a side of said first leg facing said table below said pivot pin, and a handle for selectively rotating said wedge member;
a post mounted for substantially vertical sliding movement by said second leg in substantial alignment with the center of said table; and
a clamp for clamping said post to said second leg.

7. The tire changing apparatus of claim 6 wherein said rim clamps have hook-like, rim-engaging formations thereon, said rim-engaging formations each including a generally horizontal surface extending radially inwardly and spaced substantially above the upper surface of the corresponding arm.

* * * * *